United States Patent [19]

Ichimura et al.

[11] Patent Number: 5,462,693
[45] Date of Patent: Oct. 31, 1995

[54] AIR PURIFYING AGENT AND A PROCESS FOR PRODUCING SAME

[75] Inventors: Shozo Ichimura; Seikichi Tabei; Michinori Hashimoto, all of Tokyo, Japan

[73] Assignee: Nippon Chemical Industrial Co., Ltd., Tokyo, Japan

[21] Appl. No.: 66,196

[22] Filed: May 25, 1993

[51] Int. Cl.$^6$ ................................................. B01J 20/20
[52] U.S. Cl. .................... 252/190; 252/191; 252/192; 423/239.1; 423/244.02; 423/244.03; 423/427
[58] Field of Search ...................... 252/189, 102; 423/239.1, 244.02, 427, 244.03; 502/417, 182, 423, 239.1, 244.02, 427, 244.03

[56] References Cited

U.S. PATENT DOCUMENTS

| | | | |
|---|---|---|---|
| 3,545,915 | 12/1970 | Lutchko et al. | 423/247 |
| 4,003,979 | 1/1977 | Kanno | 423/247 |
| 4,707,467 | 11/1987 | Benisek et al. | 423/244.03 |
| 4,855,276 | 8/1989 | Osborne et al. | 423/244.02 |
| 5,214,014 | 5/1993 | Yoshimoto et al. | |
| 5,346,876 | 9/1994 | Ichimura et al. | 502/417 |

FOREIGN PATENT DOCUMENTS

| | | |
|---|---|---|
| 526077A1 | 2/1973 | European Pat. Off. |
| 62283812 | 5/1988 | Japan |
| 044858 | 12/1991 | Japan |
| 4-7038 | 4/1992 | Japan |
| 617369 | 7/1978 | U.S.S.R. |
| 1637867A | 3/1991 | U.S.S.R. |

*Primary Examiner*—Gary L. Geist
*Assistant Examiner*—Valerie Fee
*Attorney, Agent, or Firm*—Oblon, Spivak, McClelland, Maier & Neustadt

[57] ABSTRACT

An air purifying agent comprising a carrier which contains short pulp fiber, on which one or more chemical components selected from the group consisting of acids, alkalis, oxidizing agents, reducing agents and antimicrobial components are supported. According to the present invention, an air purifying agent which is low in weight, is safe to handle and exhibits excellent effect in removing contaminated gases containing low concentrations of contaminants.

8 Claims, No Drawings

AIR PURIFYING AGENT AND A PROCESS FOR PRODUCING SAME

BACKGROUND OF THE INVENTION

1. Field of the Invention

The present invention relates to an air purifying agent and a process for producing same. More particularly, the present invention relates to a highly effective air purifying agent which can effectively purify even the environmentally polluted air that has very low concentrations of contaminants and a process for producing same.

2. Description of Prior Art

Nowadays, it has become a large problem to clean the earth's environment. In particular, control and prevention of air pollution is a pressing problem, and there has been a strong demand for purifying polluted air which contains low concentrations of contaminating gaseous substances and is located around all types of environments including working environments in various industries and living environments.

Heretofore, as means for purifying air, dry-type processes and wet-type processes have been known. Among these processes, in view of convenience, a dry-type purification process using activated carbon has been practically utilized. On the other hand, various kinds of air purifying agents which exhibit selective adsorbing effects according to the type of contaminated gas have been developed. For example, an air purifying agent which comprises supporting basic or acidic chemical components on a porous carrier is effective for removal of an acidic gas or basic gas, respectively. Particularly, air purifying agents which comprise supporting an oxidizing or reducing agent on a carrier have been widely used in industrial fields since they have high decomposing and purifying effects on contaminated gases due to their powerful oxidation and reduction abilities.

Such air purifying agents have been proposed in Japanese Patent Application Laid Open Nos. 60-827, 3-23863, etc. These air purifying agents comprise a carrier, such as activated alumina, zeolite, and so on, on which potassium permanganate is supported. Japanese Patent Application Laid Open Nos. 61- 68136, 62-161372 and 62-161373 proposed air purifying agents comprising activated carbon on which iodate and/or inorganic acid are supported.

Although these air purifying agents have been made practical in accordance with their intended use, they have some defects in that they not only have certain respective demerits as well as merits, but they are also limited in use since they have peculiar physical properties.

For example, a potassium permanganate-based air purifying agent requires very careful treatment because it is soluble and is a powerful oxidizing agent and, consequently, cannot be used in a conventional domestic field such as in the household environment. On the other hand, although the safety of activated carbon is high when being used, it has disadvantages in that not only is its ratio of removing contaminants in gases limited per se since its main removing mechanism is based on physical adsorption of the contaminants onto the activated carbon, but also in that when the activated carbon is saturated with the contaminants, the adsorbing effect is lost and desorption of the adsorbed contaminants could occur.

Accordingly, in many cases, the choice of a carrier as the air purifying agent as well as the chemical substances to be supported on the carrier is a determining factor on purifying ability and practical application of the air purifying agent.

Furthermore, not only do such prior carriers have relatively high specific gravity since they are mostly comprised of inorganic components, but they also have defects in moldability. Even if they could be molded, they would result in carriers having poor supporting ability and durability. The reason why these phenomena occur is felt to be that the porosity of the carrier is decreased by using a binder or by molding, or that its strength is reduced and deterioration occurs from reaction with contaminants or by the hydroscopic phenomenon.

Recently, in order to improve accuracy or yield of products in the manufacturing field of precision electronics such as semiconductors, or in order to enable permanent preservation of high-class art such as paintings by preventing fading or color changing, there has been a strong demand for the development of an air purifying agent which can completely and safely remove extremely low concentrations of gaseous contaminants in air. On the other hand, there has also been a strong demand for an air purifying agent which is safe to handle and exhibits excellent purifying effects in public use. For such air purifying agents, it is preferable to have as low a weight as possible in view of storage and transport, as well as use.

SUMMARY OF THE INVENTION

In view of the requirements mentioned above, the present inventors have carried out extensive studies. As a result, the present inventors have succeeded in obtaining an air purifying agent which is light in weight, safe, and which has a longer effective life, and furthermore, which exhibits excellent effectiveness in removing low concentration of contaminants in gases.

Accordingly, it is an object of the present invention to provide such an air purifying agent and a process for producing same on an industrial scale.

The air purifying agent of the present invention is characterized in that it comprises a carrier which contains short pulp fibers, on which one or more chemical components selected from the group consisting of acids, alkalis, oxidants, reductants and antimicrobial components are supported.

DETAILED DESCRIPTION OF THE INVENTION

The short pulp fiber-containing carrier of the present invention includes short pulp fibers per se or a complex of short pulp fibers as a main component and other adjuvant components such as synthetic short fibers, substantially insoluble inorganic powder, and so on.

Examples of artificial short fibers used as one of the adjuvant components as carrier include inorganic short fibers, such as carbon (activated carbon) fiber, glass fiber, silica fiber, slag wool, etc., and organic short fibers, such as polyester, polyamide, polypropylene, polyacrylonitrile, rayon, etc.

Examples of the substantially insoluble inorganic powders as adjuvant component carriers include oxides, hydroxides, carbonates, basic carbonates, silicates and phosphates of the components selected from the group consisting of calcium, magnesium, aluminum, iron, zinc, titanium, zirconium, manganese, copper, etc., and other substances such as activated carbon, aluminosilicate (zeolite), slag powder, etc.

These can be used either alone or in mixtures of two or more. Although these components may also be obtained naturally or artificially, they are preferably prepared as a porous and fine powder, if possible.

These adjuvant components as the carriers should be selected in accordance with the intended use as an air purifying agent, as required. The amount of the adjuvant components to be used is not particularly limited so far as it can be supported on short pulp fibers uniformly without separation therefrom, and in most cases, it is set at no more than 90 wt % per total weight of the carrier.

The short pulp fiber-containing carrier may be used in either molded or unmolded form, preferably molded. Any molded form may be useful, and examples of molded forms include sheet, plate, pellet and honey-comb types. When an unmolded form of carrier is used, it may be packed in an air-permeable and water-resistant bag or vessel.

In any case, the above mentioned carrier to be used in the present invention preferably has a pore volume of at least 0.5 ml/g by determination of tetrachloromethane substituted absorption method. Therefore, various kinds of machine-made paper commonly used, for example, are not useful as a carrier since their pore volume is too small. However, discarded paper which is physically or chemically peptized or pulverized can be used as a carrier of the present invention.

The chemical components to be supported on the short pulp fiber-containing carrier of the present invention are one or more chemical components selected from the group consisting of acids, alkalis, oxidizing agents, reducing agents and antimicrobial components. Examples of the acids include mineral acids such as hydrochloric acid, sulfuric acid, nitric acids, phosphonic acid, etc. and acidic metal salts thereof such as acidic aluminum phosphate, acidic iron sulfate, etc. Examples of alkalis include hydroxides and carbonates of alkali metals, hydroxides of alkali earth metals, etc. Examples of oxidizing agents include permanganates, chlorates, iodates, persulfates, ferrates, percarbonates and perborates of alkali metals, etc. Examples of reducing agents include phosphites and hydrophosphites of alkali metals, etc. Examples of antimicrobial components include silver nitrate, alkyltrimethylammonium chloride, alkyldimethylammonium chloride, vinylbenzylphosphonium chloride and polymers thereof, dehydroacetic acid and its alkali metal salt, sorbic acid and its alkali metal salt, etc. These components may be used either alone or in combination.

The amount of chemical components to be supported on the carrier mentioned above may vary in the range of approximately 0.1 to 50 wt %, preferably 0.3 to 20 wt %, per total weight of the air purifying agent, depending on the kinds of chemical components, physical and chemical properties of carrier, the intended use of the air purifying agent, and so on.

In the present invention, an air purifying agent in which activated manganese dioxide and/or iodate are used as chemical components to be supported on the carrier is particularly preferred, since it exhibits an excellent removing effect on the low concentration of gaseous contaminants in the atmosphere in spite of its low concentration and is safe in treatment. For example, when permanganate solution is supported on the carrier, it is converted to activated manganese dioxide by a redox reaction with organic components based on pulp or activated carbon contained in the carrier and, consequently, is supported on the carrier as an insoluble, powerful and safe oxidizing agent. In addition, it is more preferable to use activated manganese dioxide which contains a small amount of fine particles of metals such as copper, silver, palladium and platinum, and compounds thereof, since it exhibits more powerful oxidizing effect.

Furthermore, the air purifying agent of the present invention may contain water in the amount of over equilibrium water content so long as it is neither solidified by aggregation nor changes in quality in the process of storage, transport or handling. It is rather more preferable that the water content of the air purifying agent is about 5 to 20 wt %.

In this case, the expression "water" as used herein means all components contained in the air purifying agent which will be lost when the air purifying agent is dried at 100° C. for one hour, and the water content is defined as a ratio relative to the air purifying agent.

The air purifying agent according to the present invention has a relatively large pore volume in view of the physical properties of the carrier, of at least 0.5 ml/g, preferably 0.6 to 3 ml/g by the determination of tetrachloromethane substituted absorption method. Such air purifying agents show good air purifying effects.

The process for producing the air purifying agent mentioned above according to the present invention is characterized by adsorptively supporting an aqueous solution of one or more chemical components selected from the group consisting of acids, alkalis, oxidants, reductants and antimicrobial components on a short pulp fiber-containing carrier.

The process for adsorptively supporting an aqueous solution of chemical components on a short pulp fiber-containing carrier is not limited particularly so far as the chemical components can be supported uniformly. A direct mixing process using a proper mixer and a spray mixing process are practically available. For example, by a process in which an aqueous solution of chemical components is sprayed on a carrier as mixing the carrier in the mixer, a carrier on which the chemical components are supported uniformly can be obtained. In this case, the concentration or mixing ratio of chemical components and water in a mixed solution may be determined within the range determined as the amount of the supported chemical components and water content relative to the air purifying agent.

Therefore, when the mixed aqueous solution of chemical components is prepared so that its water content is within the range of allowable water content determined in the present air purifying agent, the resulting air purifying agent can be used as a finished product without any special subsequent treatment after mixing treatment of a carrier with chemical components. On the other hand, when excess water is contained or a high molding strength of the resultant product is required, the drying treatment may be carried out, if necessary.

In the process of supporting chemical components on a carrier, assistant components such as assistant components of carrier and proper binders, for example, water soluble polymers such as MC, CMC, sodium alginate, etc, and silica sol, may be used simultaneously, as required.

Although chemical components are generally supported on a carrier prepared previously, it is also useful to fix the chemical component on the carrier at the same time the carrier is being prepared. For example, chemical components can be supported by the process in which the chemical components are dissolved in a slurry of short pulp fiber-containing carrier which is previously peptized or pulverized into fine pieces, preferably mixed with inorganic powder such as activated carbon to obtain a homogeneous slurry, followed by removing water, drying and then molding.

The air purifying agent of the present invention can remove various kinds of noxious gases or a plurality of pollutants and contaminants in the atmosphere effectively. For example, malodorous or noxious gases or substances such as hydrogenated gases, such as hydrogen sulfide, phosphines, arsines, germanes, silanes, etc., unsaturated hydrocarbons such as ethylene, ozone, CO, NOx, SOx, amines, mercaptans, carbonyl sulfide, aldehydes, phenols, etc., and the malodorous odors of sewage, animals and excrement which contain two or more of said gases or substances, can be removed effectively.

Moreover, the air purifying agent of the present invention has a sterilizing property owing to its strong oxidizing power. Especially ones on which copper, silver or antimicrobial components are supported, exhibit a more highly effective antimicrobial activity. By using such air purifying agent, it may be possible to remove noxious microorganisms in air such as bacteria, molds and viruses, as well as said malodorous odors.

As mentioned above, the air purifying agent of the present invention comprises supporting one or more chemical components selected from the group consisting of acids, alkalis, oxidants, reductants and antimicrobial components on a short pulp fiber-containing carrier which has excellent flexibility in the design of its form and pore volume. Accordingly, by using such air purifying agent, it may become possible to remove the contaminants in the atmosphere effectively in accordance with the actual circumstances of air pollution.

That is, according to the present invention, the form of a carrier can be designed arbitrarily because of the carrier which is a main component of the present air purifying agent being short fibriform, and its pore volume also can be flexibly designed so as to keep its practical molding strength. Consequently, not only can the kinds and amount of the chemical component to be supported be varied according to those of the carrier, but also the removal concentration spectrum for contaminants or noxious substances in air is broadened, as long as the chemical component does not deteriorate or the activity of the carrier on which the chemical component supported is not lost.

To addition, according to the process of the present invention, it is possible to prepare a highly effective air purifying agent by making the best use of the characteristics that the chemical components are not always supported on the carrier in an intact state due to the carrier being a special organic component, i.e., short pulp fiber, and the interrelation between the chemical components and other chemical components mixed together with or auxiliary components of the carrier.

For example, although a mixed aqueous solution of potassium permanganate and iodate is stable per se without any substantial redox reaction occurring, when the mixed solution is brought into contact with the carrier, only the potassium permanganate in the solution is reduced rapidly to be converted to activated manganese dioxide. This conversion phenomenon can be demonstrated by the lack of purplish red coloration in the color reaction which indicates the presence of $MnO_4-$ in the mixed solution after being contacted with the carrier.

On the other hand, the iodate is more stable on the carrier under the presence of the resulting activated manganese dioxide, i.e., an insoluble oxidant, than when it exists by itself. Accordingly, an air purifying agent which is prepared by employing such effect is safer in treatment and has an excellent ability to remove contaminated gas over a long period of time.

As mentioned above, according to the present invention, an air purifying agent can be provided which exhibits an excellent effect for removing contaminated gas containing low concentrations of contaminants over a long period of time, and further provides a process for producing such an air purifying agent on an industrial scale. The air purifying agent of the present invention is highly safe in treatment and has a very low weight, and furthermore, can be flexibly formed, since the main component of its carrier is porous pulp which decomposes $KMnO_4$ into activated manganese dioxide. Moreover, in the present air purifying agent, chemical components to be supported and auxiliary components of the carrier can be selected from a wide range. Consequently, the air purifying agent of the present invention is extremely useful in a wide range of applications such as in industrial fields and the general domestic fields.

EXAMPLES

There now follows a number of Examples and Comparative Examples which concretely illustrate the present invention.

Examples 1 to 3

Discarded paper was pulverized into fine pieces and molded into paper pellets (average particle diameter: 5 mm, specific weight: about 0.15 g/cc), upon which aqueous solutions of $KMnO_4$ (3 wt %), a mixture of $KMnO_4$ and $KIO_3$ ($KMnO_4$: 3 wt %, $KIO_3$: 4 wt %) and a mixture of KIO, and $K_2CO_3$ ($KIO_3$: 4 wt %, $K_2CO_3$: 2 wt %), respectively, were supported by spraying the solution on as the pellets were rotated by using a Nouter mixer to prepare three kinds of air purifying agents. The resulting samples were called Samples A, B and C, respectively.

When the $KMnO_4$-based air purifying agents were soaked out in water, no purplish red coloration which indicates the presence of $MnO_4-$ was substantially recognized and it was proved that $MnO_4-$ in the water solutions was converted to activated insoluble manganese dioxide in the carrier.

The resulting three Samples A to C were placed into Pyrex tube columns (inside diameter: 25 mm, length: 350 mm) to be evaluated for their effectiveness in removing hydrogen sulfide under the following conditions:

Gas concentration at tube entrance: about 10 ppm of $H_2S$;

Gas temperature and humidity at tube entrance: 22° to 25° C., 55 to 65% of RH;

Gas flow rate and velocity in tube: 10.3 l/min, 0.35 m/sec;

Space velocity (SV value): 20000 (l/H);

Measurement method: Gastech detector tube method (detection limit: 0.1 ppm of $H_2S$).

The results are shown in Table 1 below with the composition and pore volume of each sample.

TABLE 1

| Ex. | Sample | Composition KMnO$_4$L | KIO$_3$ | K$_2$CO$_3$ | H$_2$O | Pore volume (ml/g) | H$_2$S Removal ratio 3 hr | 5 hr | 10 hr |
|---|---|---|---|---|---|---|---|---|---|
| 1 | A | 0.5 | — | — | 13.5 | 0.98 | 95.2 | 93.0 | 91.5 |
| 2 | B | 0.4 | 0.3 | — | 12.6 | 1.00 | 98.5 | 98.0 | 98.0 |
| 3 | C | — | 0.5 | 0.2 | 13.0 | 1.96 | 92.3 | 91.0 | 90.3 |
| Blanc | | — | — | — | 13.5 | 1.01 | 21.3 | 0 | 0 |

LExpressed as KMnO$_4$. When used as air purifying agent KMnO$_4$ was converted to activated MnO$_2$.

Examples 4 to 6

Another three kinds of air purifying agents were prepared in the same manner as Examples 1 to 3 except that paper pellets containing about 50 wt % of activated carbon powder (pellet particle diameter: 3 to 5 mm) were used as a carrier. The resulting Samples called D, E and F, respectively, were evaluated for their respective effectiveness in removing about 10 ppm of H$_2$S gas under the same conditions as Examples 1 to 3. The results are shown in Table 2 below.

TABLE 2

| Ex. | Sample | Composition KMnO$_4$L | KIO$_3$ | K$_2$CO$_3$ | H$_2$O | Pore volume (ml/g) | H$_2$S Removal ratio 3 hr | 5 hr | 10 hr |
|---|---|---|---|---|---|---|---|---|---|
| 4 | D | 3.5 | 0 | 0 | 14.3 | 1.30 | 96.5 | 96.0 | 96.0 |
| 5 | E | 0.35 | 0.40 | 0 | 14.2 | 1.25 | 99.0 | 98.0 | 98.3 |
| 6 | F | 0 | 0.85 | 0.40 | 14.6 | 1.20 | 97.0 | 95.3 | 95.0 |
| Blanc | | 0 | 0 | 0 | 14.9 | 1.35 | 56.0 | 7.0 | 0 |

LExpressed as KMnO$_4$. When used as air purifying agent KMnO$_4$ was converted to activated MnO$_2$.

Examples 7 and 8 and Comparative Example 1

A potassium permanganate-based air purifying agent (particle strength: 3 kg/particle, pore volume: 0.52 ml/g) was prepared by first mixing and kneading of 60 parts by weight of activated alumina, 10 parts by weight of bentonite, 10 parts by weight of sepiolite, 5 parts by weight of potassium permanganate, 10 parts by weight of slaked lime and 21 parts by weight of silica sol (SiO$_2$: 30 wt %) with a proper amount of water, followed by pelletizing and then drying treatment. The resultant sample (Sample G) was a test sample for Comparative Example 1.

Next, the resulting Sample G and Samples B and E used in Examples 2 and 5 respectively, were subjected to a long-term gas removing test (240 to 10,000 hr) against a very dilute H$_2$S gas under the following conditions:

Gas concentration at tube entrance: about 500 ppb of H$_2$S;

Gas temperature at tube entrance: 22° to 25° C.;

Gas humidity at tube entrance: 60 to 70% of RH;

SV value: 5000 (l/H);

Measurement method: analytical method by gas chromatograph.

The results are shown in Tables 3 and 4 below.

TABLE 3

| Ex. | Sample | | Time (hr) 240 | 792 | 1362 | 1704 | 2590 | 3694 | 4678 |
|---|---|---|---|---|---|---|---|---|---|
| 7 | B | Inlet (ppb) | 498 | 548 | 560 | 454 | 524 | 710 | 515 |
| | | Outlet (ppb) | 0.10 | 0.13 | 0.12 | 0.09 | 0.14 | 2.1 | 2.6 |
| | | Removing rate (%) | 99.9 | 99.9 | 99.9 | 99.9 | 99.9 | 99.7 | 99.5 |
| 8 | E | Inlet (ppb) | 482 | 482 | 522 | 462 | 504 | 750 | 530 |
| | | Outlet (ppb) | 0.10 | 0.08 | 0.10 | 0.08 | 0.07 | 0.11 | 0.10 |
| | | Removing rate (%) | 99.9 | 99.9 | 99.9 | 99.9 | 99.9 | 99.9 | 99.9 |
| CEx. 1 | G | Inlet (ppb) | 495 | 503 | 485 | 496 | 513 | 520 | 515 |
| | | Outlet (ppb) | 0.10 | 0.16 | 0.20 | 0.80 | 7.7 | 15.6 | 25.2 |
| | | Removing rate (%) | 99.9 | 99.9 | 99.9 | 99.8 | 98.5 | 97.0 | 95.1 |

TABLE 4

| Ex. | Sample | | Time (hr) 5830 | 6526 | 7498 | 8000 | 9008 | 10000 |
|---|---|---|---|---|---|---|---|---|
| 7 | B | Inlet (ppb) | 593 | 536 | 572 | 497 | 508 | 457 |
| | | Outlet (ppb) | 5.9 | 7.9 | 14.7 | 15.0 | 25.4 | 44.4 |

TABLE 4-continued

| Ex. | Sample | | Time (hr) | | | | | |
|---|---|---|---|---|---|---|---|---|
| | | | 5830 | 6526 | 7498 | 8000 | 9008 | 10000 |
| | | Removing rate (%) | 99.0 | 98.5 | 97.5 | 97.0 | 95.0 | 90.5 |
| 8 | E | Inlet (ppb) | 560 | 532 | 547 | 475 | 508 | 457 |
| | | Outlet (ppb) | 0.13 | 0.12 | 0.09 | 0.14 | 0.10 | 0.13 |
| | | Removing rate (%) | 99.9 | 99.9 | 99.9 | 99.9 | 99.9 | 99.9 |
| CEx. 1 | G | Inlet (ppb) | 510 | 526 | 540 | 525 | 503 | 490 |
| | | Outlet (ppb) | 40.3 | 62.1 | 90.7 | 102 | 113 | 112 |
| | | Removing rate (%) | 92.1 | 88.2 | 83.2 | 80.5 | 77.5 | 77.2 |

Examples 9 and 10 and Comparative Example 2

Samples B and E used in Examples 2 and 5 respectively and Sample G used in Comparative Example 1 were subjected to a gas removing test against $SO_2$ gas under the following conditions:

Gas concentration at tube entrance: about 200 to 300 ppb of $SO_2$;

Gas temperature at tube entrance: 22° to 25° C.;

Gas humidity at tube entrance: 55 to 65% RH;

Gas velocity: 20 l/min;

SV value: 50000 (l/H);

Column: inside diameter: 25 mm, length: 350 mm (Pyrex tube);

Measurement method: analytical method by gas chromatograph.

The results are shown in Table 5 below.

TABLE 5

| Ex. | Sample | | Time (hr) | | | | |
|---|---|---|---|---|---|---|---|
| | | | 1 | 3 | 6 | 24 | 168 |
| 9 | B | Inlet (ppb) | 283 | 214 | 244 | 309 | 244 |
| | | Outlet (ppb) | 0.23 | 0.26 | 0.84 | 1.1 | 5.5 |
| | | Removing rate (%) | 99.9 | 99.8 | 99.6 | 99.6 | 97.7 |
| 10 | E | Inlet (ppb) | 283 | 214 | 244 | 309 | 244 |
| | | Outlet (ppb) | 0.08 | 0.10 | 0.05 | 0.60 | 0.08 |
| | | Removing rate (%) | 99.9 | 99.9 | 99.9 | 99.7 | 99.9 |
| CEx. 2 | G | Inlet (ppb) | 283 | 214 | 244 | 309 | 244 |
| | | Outlet (ppb) | 0.81 | 0.70 | 0.57 | 2.20 | 11.2 |
| | | Removing rate (%) | 99.7 | 99.7 | 99.8 | 99.3 | 95.4 |

Example 11

Sample E used in Example 5 was subjected to a gas removing test against PH3 gas under the following conditions:

Gas concentration at tube entrance: about 5 ppm of PH3;

Gas temperature at tube entrance: 22° to 25° C.;

Gas humidity at tube entrance: 50 to 60% of RH;

SV value: 10000 (l/H);

Column: inside diameter: 25 mm, length: 350 mm (Pyrex tube);

Measurement method: Gastech detector tube method (7 L).

The results are shown in Table 6 below.

TABLE 6

| | Time (hr) | | | | | | | |
|---|---|---|---|---|---|---|---|---|
| | 0.5 | 1 | 5 | 10 | 15 | 20 | 25 | 30 |
| Inlet (ppb) | 5.1 | 5.0 | 5.3 | 5.1 | 5.2 | 5.0 | 5.1 | 5.1 |
| Outlet (ppb) | ND | ND | ND | ND | ND | ND | ND | ND |
| Removing rate (%) | 99.9 | 99.9 | 99.9 | 99.9 | 99.9 | 99.9 | 99.9 | 99.9 |

Example 12 and Comparative Example 3

On paper pellets containing about 20 wt % of slaked lime fine powder (Pellet particle diameter: 3 to 6 mm), an alkaline aqueous solution of LiOH (5.0 wt %) and $K_3PO_4$ (2.5 wt %) were sprayed during mixing in a Nouter mixer. The resulting air purifying agent (LiOH: 1.05 wt %, $K_3PO_4$: 0.52 wt %, pore volume: 1.20 ml/g) was called Sample H.

Sample H was evaluated for its effectiveness in removing the various kinds of acidic gases shown in Table 7 under the following conditions:

Gas temperature at tube entrance: 22° to 25° C.;

Gas humidity at tube entrance: 50 to 60% of RH;

SV value: 10000 (l/H);

Column: inside diameter: 25 mm, length: 350 mm (Pyrex tube);

Measurement method: Gastech detector tube method.

The results are shown in Table 7.

A comparative test was also carried out by using coconut husk activated carbon (particle diameter: 3 to 5 mm), called Sample I, as a sample for Comparative Example 3 in the same manner as the evaluation of Sample H, and the results are also shown in Table 7.

TABLE 7

| Ex. | Sample | Removed gas | Inlet gas conc (ppm) | Removal ratio (%) Time (hr) | | | | |
|---|---|---|---|---|---|---|---|---|
| | | | | 0.5 | 4 | 6 | 8 | 10 |
| 12 | H | HCl | 15 | 100 | 100 | 100 | 100 | 99.9 |
| | | HF | 5 | 100 | 100 | 100 | 100 | 100 |
| | | CO$_2$ | 1.6 | 100 | 100 | 100 | 100 | 100 |
| CEx. 3 | I | HCl | 15 | 100 | 88 | 75 | 30 | 13 |
| | | HF | 5 | 100 | 93 | 62 | 25 | 7 |
| | | CO | 1.6 | 100 | 98 | 93 | 65 | 30 |

Example 13

100 Parts by weight of paper pellets containing about 25 wt % of silica gel fine powder (average particle diameter of powder: 2.3 m, pellet particle diameter: 3 to 6 mm) were soaked in 150 parts by weight of aqueous solution containing 20 wt % of acidic aluminum phosphate [Al(H$_2$PO$_4$)$_3$] for 10 minutes, followed by drying at 100° C. for one hour to obtain a air purifying agent (SiO$_2$: 22.5 wt %, Al(H$_2$PO$_4$)$_3$: 15.3 wt %, H$_2$O: 13.5 wt %, pore volume: 1.36 ml/g). The resultant sample called Sample J was subjected to an evaluation for its effectiveness in removing gases shown in Table 8 under the following conditions:

Gas temperature at tube entrance: 22° to 25° C.;
Gas humidity at tube entrance: 50 to 60% of RH;
SV value: 10000 (l/H);
Column: inside diameter: 25 mm, length: 350 mm (Pyrex tube);
Measurement method: Gastech detector tube method.
The results are shown in Table 8 below.

TABLE 8

| Ex. | Sample | Removed gas | Inlet gas conc(ppm) | Removal ratio (%) Time (hr) | | | | |
|---|---|---|---|---|---|---|---|---|
| | | | | 0.5 | 2 | 4 | 8 | 10 |
| 13 | J | Ammonia | 5 | 100 | 100 | 100 | 99.9 | 99.9 |
| | | Triethylamine | 3 | 100 | 100 | 100 | 100 | 100 |

Examples 14 and 15 and Comparative Examples 4 to 7

Pulp honey-combs containing about 65 wt % of activated carbon fine powder (bore size of pulp honey-comb: 2 mm) were cut off into 22 mm×22 mm×9 mm pieces, and soaked in an aqueous solution in which 4 parts by weight of KMnO$_4$ and 5 parts by weight of KIO$_3$ were dissolved at 50° C. for 10 minutes, followed by a drying step to obtain an air purifying agent with a water content of 12.5 wt %. The resulting sample was called Sample K.

Another air purifying agent was prepared by uniformly spraying 0.05 wt % of an aqueous solution of tributhylvinylbenzylphosphonium chloride polymer on said Sample K. The resulting sample was called Sample L.

Four kinds of comparative air purifying agents were also prepared by supporting 4% by weight of potassium permanganate on activated alumina honey-comb (bore size: 1 mm); by supporting 1% by weight of potassium iodate on the one which was same as said activated alumina honey-combs; by supporting 3% by weight of potassium permanganate on zeolite honey-combs; and by using the activated carbon honey-combs alone. These resulting samples were called Samples M, N, O and P respectively.

These samples were subjected to an evaluation for effectiveness in removing SO$_2$ gas under the following conditions:

Gas concentration at tube entrance: 585 ppm of SO$_2$;
Gas temperature at tube entrance: room temperature;
Gas humidity at tube entrance: 50 to 60% of RH;
Gas flow rate: 10 l/min;
SV value: 25000 (l/H);
Measurement method: Gastech detector tube method.
The results are shown in Table 9 below.

TABLE 9

| Ex. | Sample | Time (hr) | | |
|---|---|---|---|---|
| | | 0.5 | 1 | 2 |
| 14 | K | 99.9 | 99.9 | 98.0 |
| 15 | L | 99.9 | 99.9 | 98.0 |
| CEx. | | | | |
| 4 | M | 78.5 | 73.6 | 70.2 |
| 5 | N | 80.3 | 75.4 | 72.1 |
| 6 | O | 76.9 | 72.6 | 73.1 |
| 7 | P | 60.5 | 10.3 | — |

What is claimed is:

1. An air purifying agent comprising a carrier containing short wood pulp fiber as a main component, on which one or more chemical components for purifying polluted air are supported, wherein the chemical component is selected from the group consisting of an oxidizing agent comprising an activated manganese dioxide derived from the decomposition of permanganate and iodate; an acid selected from the group consisting of phosphoric acid, acidic aluminum phosphate, and acidic iron sulfate; an alkali selected from the group consisting of alkali metal hydroxide, alkali metal carbonate and alkaline earth metal hydroxide; and an antimicrobial component selected from the group consisting of silver nitrate, alkyltrimethyl ammonium chloride, alkyldimethyl ammonium chloride, vinylbenzyl phosphonium chloride and a polymer thereof, dehydroacetic acid and an alkali metal salt thereof, and sorbic acid and an alkali metal salt thereof; wherein the total amount of supported chemical components on said short wood pulp fiber containing carrier is in the range of 0.1 to 50% by weight of the air purifying agent;

the pore volume of said carrier is within the range from 0.5 to 3.0 ml/g; and said agent contains water in an amount ranging from 5 to 15% by weight per total weight.

2. An air purifying agent according to claim 1, wherein the agent contains synthetic short fibers.

3. An air purifying agent according to claim 2, wherein the synthetic short fibers are selected from the group consisting of activated carbon fiber, glass fiber, silica fiber, slag wool, polyester, polyamide, polypropylene, polyacrylonitrile and rayon.

4. An air purifying agent according to claim 1, wherein said carrier contains a substantially water insoluble inorganic powder in an amount not greater than 90% by weight per total weight of the carrier.

5. An air purifying agent according to claim 4, wherein the water-insoluble inorganic powder is selected from the group consisting of oxides, hydroxides, carbonates, silicates, activated carbon, aluminosilicate, and phosphates selected from the group consisting of calcium, magnesium, aluminum, iron, zinc, titanium, zirconium, manganese and copper.

6. An air purifying agent according to claim 5, wherein said carrier is a mixture of short wood pulp fiber and activated carbon.

7. An air purifying agent according to claim 1, wherein the carrier which contains short wood pulp fiber may be in either a molded or unmolded form.

8. An air purifying agent according to claim 7, wherein the molded form is selected from the group consisting of sheet, plate, pellet and honey-comb.

* * * * *